G. WATT.

Plow.

No. 3,071.

Reissued Aug. 4, 1868.

N. PETERS, PHOTO-LITHOGRAPHER, WASHINGTON, D. C.

UNITED STATES PATENT OFFICE.

GEORGE WATT, OF RICHMOND, VIRGINIA.

IMPROVEMENT IN PLOWS.

Specification forming part of Letters Patent No. 19,321, dated February 9, 1858; Additional Improvement dated August 2, 1859; Reissue No. 3,071, dated August 4, 1868.

*To all whom it may concern:*

Be it known that I, GEORGE WATT, of Richmond, in the county of Henrico and State of Virginia, have invented certain new and useful Improvements in Plows; and I do hereby declare that the following is a full, clear, and exact description of the construction and operation of the same, reference being had to the annexed drawings, forming part of this specification, on Sheet 1 of which drawings—

Figure 1:
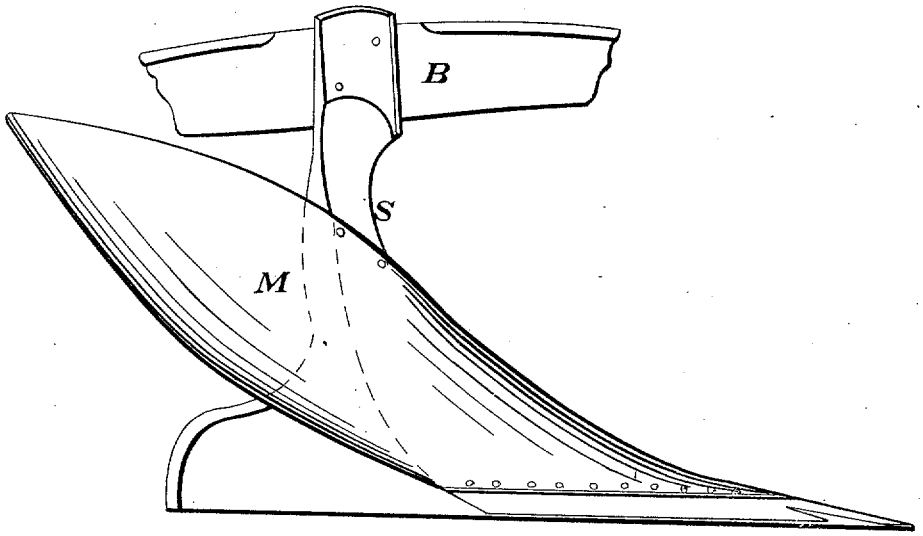
Figure 3:
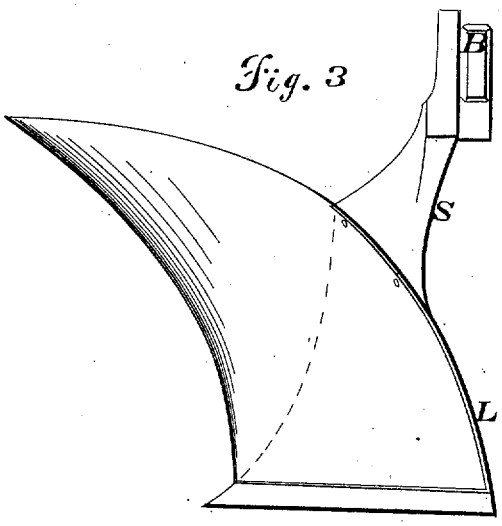
Figure 2:
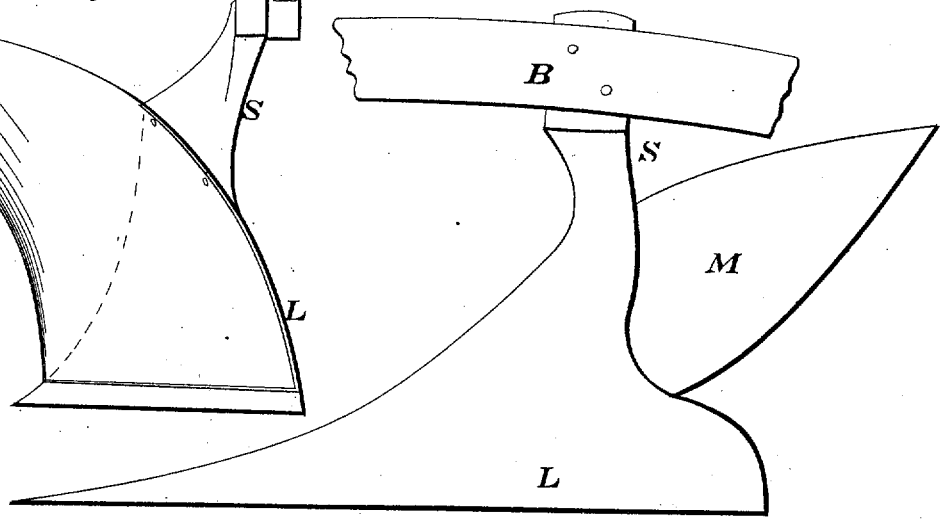

Figure 1 is a mold-board elevation of my improved plow. Fig. 2 is a land-side elevation. Fig. 3 is a front view, showing the curve of land side.

On Sheet 2 is a representation of the additional improvement annexed to my patent of February 9, 1858, on the 2d day of August, 1859, and on this sheet Fig. 1 is a rear view of a plow illustrating said additional improvement. Fig. 2 is a section on line *x x*. Fig. 3 is a section on line *y y*, showing the notches on the beam and the eccentric roller.

Similar letters of reference indicate the same parts in the different figures.

One important feature of this invention consists in so constructing the plow that while the landside shall have an inward inclination from its base the neck or standard above the landside shall have an outward inclination, so that in operation the oblique landside serves to hold or properly confine the plow in the ground, leave an overhanging side to the furrow to facilitate the turning of the succeeding furrow, and, when cultivating, to loosen up the surface-ground about the roots of the plants, while the outward projecting neck or standard serves to press or throw the earth toward the growing plants on the unplowed ground or "land."

It will be seen that in carrying out this part of the invention it is not necessary to adopt the particular construction represented in the drawings and described in the ensuing specification. Thus it is manifestly immaterial to the point in question whether the inwardly-inclining landside and outwardly-inclining breast or standard have curved surfaces, as represented, or straight surfaces. As a practical representation of this feature is given in the drawings and a sufficient description embodied in the following specification, it is needless to make it a mattter of detailed explanation.

The invention further consists in constructing both mold-board and landside of cylindrical surfaces, the turn of the mold-board commencing from the extreme point, and the cutting edge being determined by the intersection of the said cylindrical surfaces, the mold-board having its concavity outward and the landside its convexity outward, said construction being combined with the curved standard, hereinafter to be described.

The invention further consists of a novel cuff attachment, hereinafter described, the same forming the subject of the additional improvement above referred to.

In the drawings, M is the mold-board; L, the landside; S, the standard, and B the beam. The mold-board turns outward in a regular cylindrical surface from its intersection with the share, the elements of the cylinder being respectively parallel to this line of intersection.

The landside L is a regular cylindrical surface of the same diameter as the cylinder of which the mold-board forms a portion, the front or cutting edge of the plow being formed by the intersection of their two surfaces.

The standard S curves landward from the upper extremity of the cylindrical landside, being cut away and hollowed out on the mold-board side to prevent clogging, as described in my patent of December 9, 1856, reissued November 10, 1857.

The landside L, being of cylindrical form, passes obliquely under the soil, by which the plow is rendered much more steady, as it is prevented from rising at the heel or tilting over. It also saves the point from beveling from wear. It moreover leaves an overhanging arch of soil, which is more easily turned in making the succeeding furrow. As before stated, the oblique landside also serves to loosen up the ground about the roots of the plants.

Owing to the perfect cylindrical surfaces of mold-board and landside and their intersection along the cutting-edge, the soil is gradually turned over from the extreme point upward, by which a considerable saving in draft is effected. The curving of the standard, as shown in the drawings, permits the rising earth to pass off without clogging under the beam, and its landward inclination causes it to push the loose earth toward the growing plants on the unplowed ground.

I do not claim of itself the inclination of the landside toward the mold-board for the purpose of leaving soil overhanging the furrow, as such device, broadly considered, is not new.

On the lower branch of the cuff attachment, (see Sheet 2,) for forcing the beam against the upper branch thereof, is an eccentric roller, whereby the lateral pressure of the cuff on the beam may be diminished. The rear of the beam is secured to the handles by a single bolt, and the handles to their attachments each by a single bolt, so that the depth of plowing is graduated by adjusting the beam in the cuff. There are notches on the top of the beam for the reception of the upper branch of the cuff, or a notched plate placed thereon.

In the drawings, H is the handles; B, the beam; M, the mold-board; L, the landside, which are secured to each other by the lapping flanges *a* and *a'*, *b* and *b'*, bolted together.

C is the brace, extending from mold-board to landside, having flanges *d*, to which the mold-board and landside are bolted, and also two arms, *e e*, to which the handles are secured by a single bolt.

S is the standard, to which is fastened the cuff *f*, through which the beam passes, having on its lower branch an eccentric roller, *r*, for forcing the beam against the upper branch thereof, thereby diminishing the lateral pressure of the cuff on the beam, and the rear of the beam being secured to the handles by the single bolt *h*, and the handles to their lower attachment, *e e*, by single bolts, the beam can be adjusted in the cuff *f*, there being notches *i i* in the top of it to receive the upper branch of the cuff, and thus regulate the depth of plowing.

Having thus described my invention, the following is what I claim as new and desire to secure by Letters Patent:

1. The combination, in a plow, of a landside having an inward inclination from its base toward the mold-board, and a neck, breast, or standard having a diverse or outward inclination, substantially as set forth.

2. Constructing mold-board and landside of cylindrical surfaces intersecting along the cutting edge of the plow, in combination with the curved standard S, the whole being constructed substantially as and for the purposes hereinbefore set forth.

3. The combination of the eccentric roller *r*, beam B, notches *i*, and cuff *f*, substantially as set forth.

GEO. WATT.

Witnesses:
C. M. PLEASANTS,
R. W. HAW.